(12) United States Patent
Brand et al.

(10) Patent No.: US 11,926,300 B2
(45) Date of Patent: Mar. 12, 2024

(54) ADAPTIVE BRAKE CONTROL SYSTEM FOR GROUND SUPPORT EQUIPMENT, AND METHOD OF RETROFITTING THEREOF

(71) Applicants: ZIV AV ENGINEERING LTD., Be'erot Itzhak (IL); TRI-LOGICAL TECHNOLOGIES LTD, Rishon Lezion (IL)

(72) Inventors: Dvir Brand, Hod Hasharon (IL); Gavriel Hai Yaniv, Rishon Lezion (IL)

(73) Assignees: ZIV AV ENGINEERING LTD., Be'erot Itzhak (IL); TRI-LOGICAL TECHNOLOGIES LTD, Rishon Lezion (IL)

( * ) Notice: Subject to any disclaimer, the term of this patent is extended or adjusted under 35 U.S.C. 154(b) by 216 days.

(21) Appl. No.: 17/429,047

(22) PCT Filed: Mar. 4, 2020

(86) PCT No.: PCT/IB2020/051875
§ 371 (c)(1),
(2) Date: Aug. 6, 2021

(87) PCT Pub. No.: WO2020/178764
PCT Pub. Date: Sep. 10, 2020

(65) Prior Publication Data
US 2022/0048480 A1  Feb. 17, 2022

Related U.S. Application Data

(60) Provisional application No. 62/814,080, filed on Mar. 5, 2019.

(51) Int. Cl.
*B60T 7/22* (2006.01)
*B60Q 9/00* (2006.01)
(Continued)

(52) U.S. Cl.
CPC .............. *B60T 7/22* (2013.01); *B60Q 9/008* (2013.01); *B60T 1/062* (2013.01); *B60T 8/58* (2013.01);
(Continued)

(58) Field of Classification Search
CPC ... B60T 7/22; B60T 1/062; B60T 8/58; B60Q 9/008; B60W 10/103; B60W 10/184; B60W 30/09
(Continued)

(56) References Cited

U.S. PATENT DOCUMENTS 4,224,832 A  9/1980  Prohaska et al.
4,964,485 A  10/1990  Miele
(Continued)

FOREIGN PATENT DOCUMENTS

CN  202608753 U  12/2012
DE  10 2017 119 003 A1  2/2019
WO  2014/054937 A1  4/2014

OTHER PUBLICATIONS

International Search Report of PCT/IB2020/051875 dated Jun. 8, 2020 [PCT/ISA/210].
(Continued)

*Primary Examiner* — Colby M Hansen
(74) *Attorney, Agent, or Firm* — Sughrue Mion, PLLC

(57) ABSTRACT

An adaptive brake control system for use in Ground Support Equipment (GSE) including a speed control system. The adaptive brake control system includes a distance sensor adapted to measure a distance from an edge of the GSE to an external object and a speed senor adapted to measure a ground speed of the GSE. An actuator, such as a brake actuator, is adapted to cause the speed control system of the GSE to slow or stop the GSE. A controller is functionally associated with the distance sensor, the speed sensor, and the (Continued)

actuator. The controller is adapted to receive inputs from the distance sensor and the speed sensor, and, based on the received inputs, to trigger the actuator to affect slowing or stopping of the GSE.

28 Claims, 13 Drawing Sheets

(51) Int. Cl.
| | |
|---|---|
| *B60T 1/06* | (2006.01) |
| *B60T 8/58* | (2006.01) |
| *B60W 10/103* | (2012.01) |
| *B60W 10/184* | (2012.01) |
| *B60W 30/09* | (2012.01) |
| *B60T 13/68* | (2006.01) |

(52) U.S. Cl.
CPC ........ *B60W 10/103* (2013.01); *B60W 10/184* (2013.01); *B60W 30/09* (2013.01); *B60T 13/68* (2013.01); *B60T 2201/022* (2013.01); *B60T 2210/30* (2013.01); *B60T 2250/04* (2013.01); *B60W 2520/10* (2013.01); *B60W 2554/20* (2020.02); *B60W 2710/10* (2013.01); *B60W 2710/18* (2013.01); *B60Y 2300/09* (2013.01)

(58) Field of Classification Search
USPC .......................................................... 701/53
See application file for complete search history.

(56) References Cited

U.S. PATENT DOCUMENTS

| | | |
|---|---|---|
| 2009/0099710 A1 | 4/2009 | Takach, Jr. |
| 2016/0334790 A1 | 11/2016 | Rust et al. |
| 2017/0305397 A1* | 10/2017 | Cheng .................... B60T 8/261 |
| 2020/0262403 A1* | 8/2020 | Kuras ....................... B60T 8/58 |

OTHER PUBLICATIONS

Written Opinion of PCT/IB2020/051875 dated Jun. 8, 2020 [PCT/ISA/237].
Extended European Search Report dated May 31, 2023 in Application No. 20766656.1.

* cited by examiner

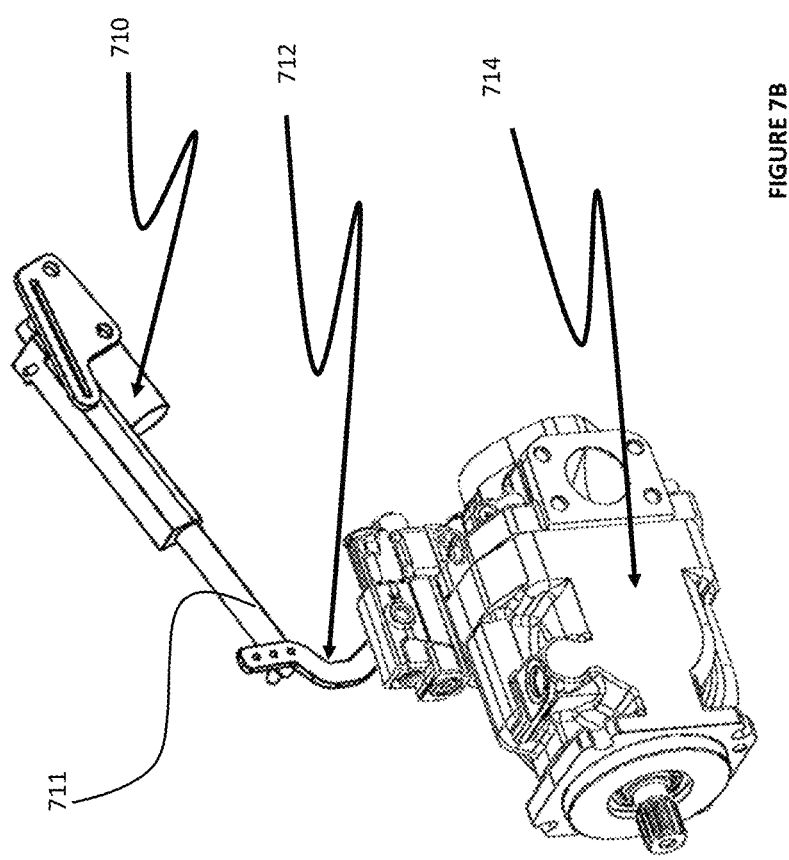

ADAPTIVE BRAKE CONTROL SYSTEM FOR GROUND SUPPORT EQUIPMENT, AND METHOD OF RETROFITTING THEREOF

CROSS REFERENCE TO RELATED APPLICATIONS

This application is a National Stage of International Application No. PCT/IB2020/051875, filed Mar. 4, 2020, claiming priority from U.S. provisional application 62/814,080 filed Mar. 5, 2019 and entitled "Adaptive Brake Control System for Ground Support Equipment", which is incorporated herein by reference in its entirety.

FIELD OF THE INVENTION

The present invention relates in general to systems for avoiding collision of moving vehicles, and specifically to systems for avoiding collisions between moving vehicles and parked or still obstacles, such as collisions between airport ground support equipment and aircrafts. The present invention further relates to methods of retrofitting vehicles, such as ground support equipment, with such systems.

BACKGROUND OF THE INVENTION

In airports, collisions between ground support equipment (GSE) and aircrafts on the ground are a source for great damage and cost to the industry. In order to reduce the number of such collisions, the International Air Transport Association (IATA) has issued regulations, named IATA AHM 913, requiring the installation of collision prevention systems in GSEs and imposing a limit on the maximal allowable ground speed of a moving GSE when approaching an aircraft.

IATA AHM 913 includes several main requirements:
(i) * The GSE must have three levels of speed limits, as a function of the distance between the GSE and the aircraft. These speed limits are named tortoise, snail, and stop at safe distance;
(ii) * The GSE must have the ability to automatically and immediately stop if actual contact is made with aircraft; and
(iii) * The GSE must have facility to record all occasions when it had automatically stopped due to unintended contact with an aircraft.

Compliance with AHM 913 regulations may be relatively easy to achieve utilizing technologies available today for prevention of collision of road vehicles, such as systems provided by Mobileye (https://www.mobileye.com/), adaptive cruise control systems and/or technologies existing and/or developed for autonomous vehicles. While this seems to be the preferred solution for newly manufactured or modern GSE, the installation of such solutions in existing, or relatively old GSE, may not be technically possible, or may be too expensive. It is estimated that there are hundreds of thousands of such old GSE in the world, and as such, the ability to retrofit old GSE into compliance with changing regulations, has a clear and significant advantage.

Thus, there is a need in the art for a simple, inexpensive system and method for retrofitting "old" GSEs to comply with current IATA regulations, which system can be installed without the need for major changes in the GSE.

SUMMARY OF THE INVENTION

In accordance with an embodiment of the disclosed technology, there is provided an adaptive brake control system for use in Ground Support Equipment (GSE) including a speed control system, the system including:
  a distance sensor adapted to measure a distance from an edge of the GSE to an external object;
  a speed senor adapted to measure a ground speed of the GSE;
  an actuator adapted to cause the speed control system of the GSE to slow or stop the GSE; and
  a controller, functionally associated with the distance sensor, the speed sensor, and the actuator, the controller adapted to receive inputs from the distance sensor and the speed sensor, and, based on the received inputs, to trigger the actuator to affect slowing or stopping of the GSE.

In some embodiments, the adaptive brake control system further includes at least one alarm system, functionally associated with the controller, and wherein the controller is adapted to trigger the alarm system to provide a perceivable alarm in response to the controller identifying hazardous conditions of the GSE.

In some embodiments, the adaptive brake control system further includes a wireless communication system, functionally associated with the controller, and wherein the controller is adapted to operate the wireless communication system to provides at least one signal to a location remote from the GSE. In some such embodiments, the at least one signal includes at least one of an alert signal, an alarm signal, a sensor reading, or an indication of an event.

In some embodiments, the speed control system of the GSE includes a brake pedal.

In some embodiments, the actuator is a brake actuator.

In some such embodiments, the brake actuator includes a rotaty actuator, a lever connected to the rotary actuator, such that motion of the lever is driven by rotation of the rotary actuator, and a roller connected to the lever, such that the roller is rotatable about its axis, such that rotation of the rotary actuator in a first direction causes corresponding rotation of the lever and the roller, such that the roller applies force to the brake pedal to slow motion of the GSE, and rotation of the rotary actuator in a second, opposing direction causes corresponding rotation of the lever and the roller in the second direction, such that the roller relieves force from the brake pedal to enable acceleration of the GSE.

In some other such embodiments, the brake actuator includes a linear actuator driving a piston, a lever subsystem attached at one end thereof to the piston of the linear actuator, such that motion of the lever subsystem is driven by motion of the piston, and a roller connected to the lever subsystem at an opposing end thereof, such that the roller is rotatable about its axis, such that motion of the piston in a first direction causes corresponding motion of the lever subsystem and the roller, such that the roller applies force to the brake pedal to slow motion of the GSE, and motion of the piston in a second, opposing direction causes corresponding motion of the lever and the roller in the second direction, such that the roller relieves force from the brake pedal to enable acceleration of the GSE.

In yet other such embodiments, the brake actuator includes a linear actuator driving a piston, a linking chain extending between the piston of the linear actuator and the brake pedal, and a guiding roller maintaining tension of the linking chain, such that motion of the piston in a first direction pulls an end of the linking chain, which pulls the brake pedal to slow motion of the GSE, and motion of the piston in a second, opposing direction causes release of the linking chain and the brake pedal to enable acceleration of the GSE.

In some embodiments, the speed control system of the GSE includes a pneumatic or hydraulic braking subsystem.

In some such embodiments, the pneumatic or hydraulic braking subsystem includes a brake valve in fluid communication with a brake chamber, and the actuator includes a valve controller adapted to provide command signals to the brake valve of the pneumatic or hydraulic braking subsystem, to change the pressure flow through the brake valve into the brake chamber, thereby to change the pressure in the brake chamber and to apply a braking force to the GSE.

In some other such embodiments, the pneumatic or hydraulic braking subsystem includes a hydrostatic drivetrain including a speed control lever and a variable displacement pump having a volume, the volume being controlled by the speed control lever.

In yet other such embodiments, the pneumatic or hydraulic braking subsystem includes one or more hydraulic servo valves, in signal communication with an electronic control unit, and the actuator includes a signal splitter box, disposed between the one or more hydraulic servo valves and the electronic control unit, and in signal communication with the controller of the adaptive brake control system, such that the controller of the adaptive brake control system is adapted to provide electronic signals to the one or more hydraulic servo valves via the signal splitter box, thereby to affect slowing of the GSE.

In accordance with another embodiment of the disclosed technology, there is provided a method of controlling the speed of a Ground Support Equipment (GSE) during motion of the GSE, the GSE having provided therein an adaptive brake control system as described herein, the method including:
  at the controller, receiving inputs from the distance sensor and from the speed sensor;
  at the controller, based on the inputs, determining whether a speed of the GSE need be decreased; and
  in response to determining that the speed of the GSE need be decreased, at the controller, triggering the actuator to affect slowing or stopping of the GSE.

In some embodiments, the determining includes determining whether the speed of the GSE need be decreased based on a correlation between distance inputs indicative of a distance of the GSE from another object, and speed inputs indicative of a current speed of the GSE. In some such embodiments, the correlation between the distance inputs and the speed inputs is based on regulatory requirements of the GSE.

In some embodiments the method further includes, following the triggering the actuator, providing a signal indicative of the triggering of the actuator.

In accordance with a first aspect of another embodiment of the disclosed technology, there is provided a kit for retrofitting Ground Support Equipment (GSE) including a speed control system, to automatically slow the GSE in response to hazardous conditions, the kit including:
  a distance sensor adapted to measure a distance from an edge of the GSE to an external object;
  a speed sensor adapted to measure a ground speed of the GSE; and
  an actuator adapted to cause the speed control system of the GSE to slow or stop the GSE; and
  wherein the distance sensor, the speed sensor, and the actuator are adapted to be functionally associated with a controller, the distance sensor and the speed sensor are adapted to provide signals to the controller, and the controller is adapted, based on the signals provided by the distance sensor and the speed sensor, to trigger the actuator to affect slowing or stopping of the GSE.

In accordance with a second aspect of the another embodiment of the disclosed technology, there is provided a kit for retrofitting Ground Support Equipment (GSE) including a speed control system and a speed sensor, to automatically slow the GSE in response to hazardous conditions, the kit including:
  a distance sensor adapted to measure a distance from an edge of the GSE to an external object; and
  an actuator adapted to cause the speed control system of the GSE to slow or stop the GSE; and
  wherein the distance sensor, the speed sensor of the GSE, and the actuator are adapted to be functionally associated with a controller, the distance sensor and the speed sensor are adapted to provide signals to the controller, and the controller is adapted, based on the signals provided by the distance sensor and the speed sensor, to trigger the actuator to affect slowing or stopping of the GSE.

In some embodiments of the first and second aspects, the kit further includes the controller. In other embodiments of the first and second aspects, the controller forms part of the GSE, and, during retrofitting of the GSE using the kit, the distance sensor, the speed sensor, and the actuator are associated with the controller.

In some embodiments of the first and second aspects, the speed control system of the GSE includes a brake pedal.

In some embodiments of the first and second aspects, the actuator is a brake actuator.

In some such embodiments, the brake actuator includes a rotary actuator, a lever connected to the rotary actuator, such that motion of the lever is driven by rotation of the rotary actuator, and a roller connected to the lever, such that the roller is rotatable about its axis, wherein the actuator is adapted such that, when the actuator is installed in the GSE, rotation of the rotary actuator in a first direction causes corresponding rotation of the lever and the roller, such that the roller applies force to the brake pedal to slow motion of the GSE, and rotation of the rotary actuator in a second, opposing direction causes corresponding rotation of the lever and the roller in the second direction, such that the roller relieves force from the brake pedal to enable acceleration of the GSE.

In some other such embodiments, the brake actuator includes a linear actuator driving a piston, a lever subsystem attached at one end thereof to the piston of the linear actuator, such that motion of the lever subsystem is driven by motion of the piston, and a roller connected to the lever subsystem at an opposing end thereof, such that the roller is rotatable about its axis, wherein the actuator is adapted such that, when the actuator is installed in the GSE, motion of the piston in a first direction causes corresponding motion of the lever subsystem and the roller, such that the roller applies force to the brake pedal to slow motion of the GSE, and motion of the piston in a second, opposing direction causes corresponding motion of the lever and the roller in the second direction, such that the roller relieves force from the brake pedal to enable acceleration of the GSE.

In yet other such embodiments, the brake actuator includes a linear actuator driving a piston, a linking chain adapted to extend between the piston of the linear actuator and the brake pedal, and a guiding roller maintaining tension of the linking chain, wherein the actuator is adapted such that, when the actuator is installed in the GSE, motion of the piston in a first direction pulls an end of the linking chain, which pulls the brake pedal to slow motion of the GSE, and motion of the piston in a second, opposing direction causes release of the linking chain and the brake pedal to enable acceleration of the GSE.

In some embodiments, the speed control system of the GSE includes a pneumatic or hydraulic braking subsystem.

In some such embodiments, the actuator includes a valve controller adapted to provide command signals to a brake valve of the pneumatic or hydraulic braking subsystem, to change the pressure flow through the brake valve into the brake chamber, thereby to change the pressure in the brake chamber and to apply a braking force to the GSE.

BRIEF DESCRIPTION OF THE DRAWINGS

The present invention will be understood and appreciated more readily from the following detailed description of the invention, taken in conjunction with the accompanying Figures in which:

FIGS. 7A and 7B are, respectively, a schematic representation of a hydrostatic drivetrain including a speed control lever, and a schematic representation of a sub-system for controlling oil flow within the hydrostatic drivetrain in order to limit the speed of the GSE, according to an embodiment of the invention;

DETAILED DESCRIPTION OF PREFERRED EMBODIMENTS OF THE INVENTION

Figure 1:
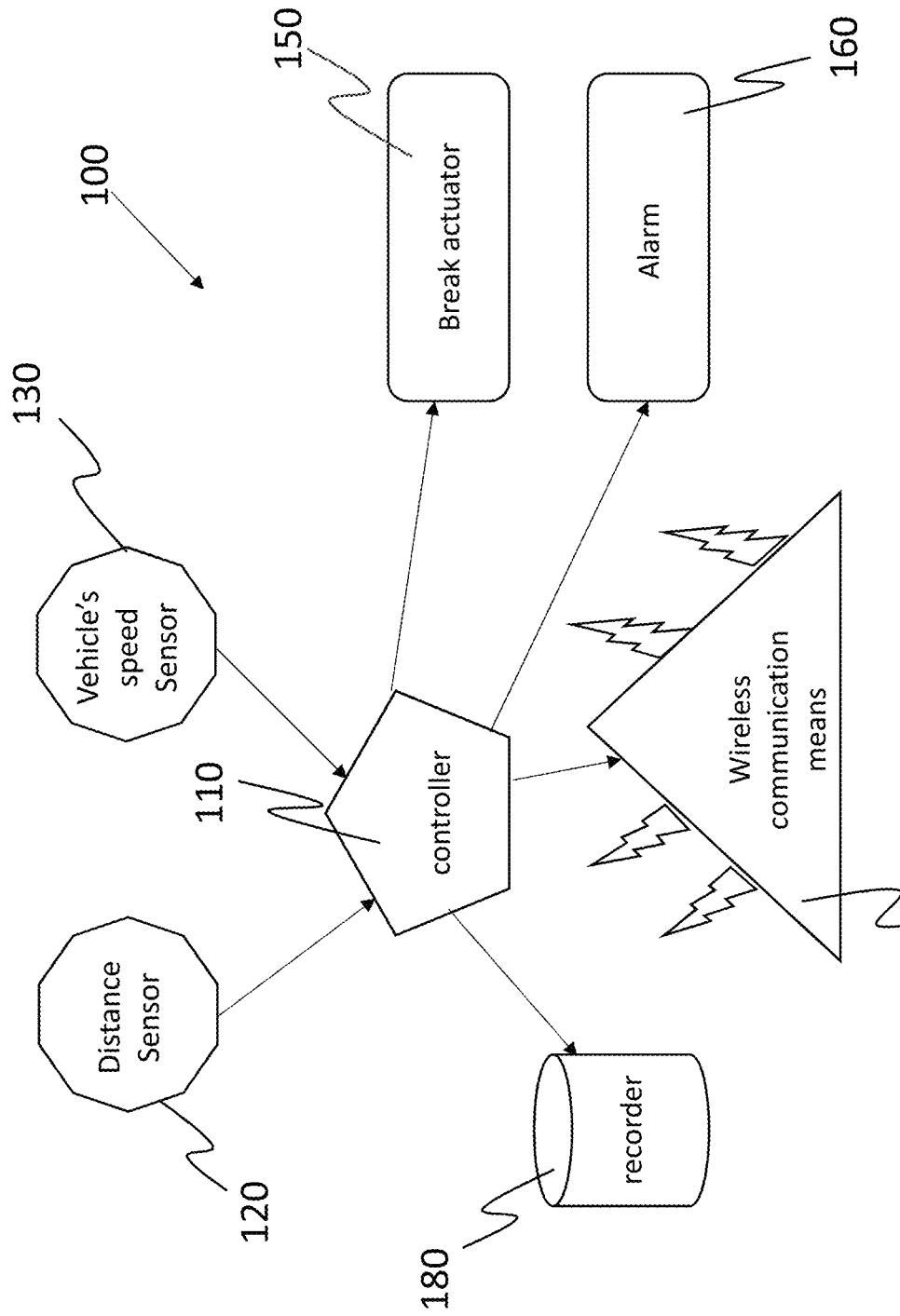
FIG. 1 is a schematic block diagram illustrating components of an Adaptive Brake Control (ABC) system according to an embodiment of the invention.

The principles of the inventive Adaptive Brake Control (ABC) system, and of methods of use thereof, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In the context of the present application and claims, the term "GSE" refers to self-propelled ground equipment, self-propelled ground support equipment, and support vehicles.

In the context of the present application and claims, the term "grounded aircraft" relates to any aircraft touching the ground, regardless of whether it is parked or is in motion, and regardless of its mechanical or technical ability to take off.

Reference is now made to FIG. 1, which is a schematic block diagram illustrating components of an ABC system 100 according to an embodiment of the invention.

Controller 110 is the center, or 'brains', of the system. Controller 110 is adapted to receive input from various sensors in the GSE, which may be integral sensors or sensors added during retrofit of the GSE, and to trigger one or more appropriate responses according to pre-set rules, as will be further detailed below. Typically, controller 110 includes a processor functionally associated with a computer readable storage medium. The storage medium stores instructions which, when executed by the processor, cause the processor to carry out actions which control the operation of the GSE as described herein. In some embodiments, controller 110 may also be functionally associated with a communication module, such as a transceiver, for receipt of communications or control signals from a remote location.

At least one distance sensor 120 is adapted to measure the distance between the GSE and external obstacles, such as a grounded aircraft toward which the GSE is moving. Distance sensor(s) 120 sends the measured distance, via a suitable communication channel, to controller 110. Suitable types of distance sensors include laser sensors, LIDAR sensors, proximity sensors, and optical sensors (e.g. cameras). In some embodiments, multiple distance sensors 120 are installed at various locations or areas of the GSE, typically in locations or areas that are susceptible to encounter or collide with grounded aircraft.

A speed monitoring sensor 130 is adapted to measure the ground speed of the GSE, and to provide signals indicative of the measured ground speed to controller 110. The speed monitoring sensor 130 may be an integral speed monitoring sensor of the GSE if such exists, or a speed monitoring sensor retroactively installed, or added onto, the GSE.

In some embodiments, controller 110 may compute the ground speed of the GSE based on a plurality of distance measurements of the distance sensor 120 and the time duration between subsequent measurements. In some cases, such a computation may be additional to identification of the speed by speed monitoring sensor 130, and as a backup thereto. In other cases, the computation of the ground speed may replace the receipt of signals from a speed monitoring sensor, and speed monitoring sensor 130 may be obviated from system 100.

Controller 110 is adapted to utilize information received from distance sensor 120 and speed monitoring sensor 130 to identify whether there is any hazardous or undesired situation occurring or about to occur, and to initiate an appropriate response according to a predetermined set of rules, preferably in compliance with IATA AHM 913 regulations, or with the relevant local regulations.

For example, when distance sensor 120 measures a certain distance to an external obstacle, such as a grounded aircraft, the appropriate maximal ground speed according to IATA regulation is calculated by controller 110 and compared to the data received from speed sensor 130, or to a ground speed calculated based on information provided from distance sensor 120, as explained above. If the measured speed is greater than the allowed maximal speed at the measured distance, controller 110 provides a trigger signal to a brake actuator 150, for the brake actuator to induce application of a braking force sufficient to slow the GSE to the permissible or desired speed. While the GSE is slowing, controller 110 continues to monitor the ground speed of the GES as calculated or as measured by speed monitoring sensor 130, and, if necessary, controller 110 provides signals to suitably adapt the applied braking force to the current speed of GSE.

Additionally or alternatively, controller 110 may also trigger an alarm, which may be a visual, vocal, sensory, or other alarm, perceivable by the operator of the GSE, to alert the operator that the GSE is currently moving too fast that proper measures need be taken, in addition to the automatic response of system 100, to handle the situation. For example, the operator may partially release the accelerator or gas pedal, thereby to reduce speed and eliminate the need for continued application of the brakes. An alert or alarm may also, or alternatively, be provided to a remote control system (not shown) via a wireless communication system 170 preferably installed in the GSE. For example, the wireless communication system may include a WiFi interface, a cellular communication interface, such as using GSM, a Bluetooth connection, or a satellite based communication interface.

In some embodiments, wireless communication system 170 may be utilized to broadcast or otherwise transmit information about or from the system 100, such as sensor readings, indications of events that had occurred, and the like, continuously, periodically, intermittently, or upon receipt of a suitable request for information.

In some embodiments, in response to identification of a hazardous or undesired situation, controller 110 may also activate warning signals, such as hazard blinking lights or a warning sound of the GSE in order to warn people and vehicles in the vicinity of the GSE.

In some embodiments, controller 110 is adapted to trigger an emergency stop of the GSE, as required by IATA regulations, such as if distance sensor 120, or a dedicated collision sensor (not explicitly shown) which may be installed in a bumper of the GSE senses an actual collision.

In some embodiments, system 100 may further include a recorder 180, adapted to record events and occurrences sensed or triggered by components of system 100. In some such embodiments, the recorder continuously records all events. In other such embodiments, controller 110 initiates recording of events by recorder 180 only in certain situations, such as when a hazardous or undesired situation, e.g. over-speeding or suspected collision, is identified.

As required by IATA regulations, in the case of a suspected collision, controller 110 is adapted to trigger brake actuator 150 to apply the full braking force to completely stop and/or disable the GSE, which may also include stalling of the motor and/or disabling of hydraulic/pneumatic systems. In such embodiments, the brake will not be released, the motor will not be reactivated, the hydraulic/pneumatic systems will not be reactivated, and in general the GSE will not be reactivated/re-enabled until the operation of the ABC system is overridden by authorized or supervising personnel, for example utilizing a special dedicated key used in a dedicated keyhole on the GSE, or via secure remote access by a controlling system. In some such embodiments, the stopping of the GSE, and/or the release thereof, are recorded, for example by recorder 180.

In some embodiments, system 100 is disabled, or is inoperative, when the GSE is moving at a speed greater than an upper threshold speed. For example, system 100 may be disabled when the GSE is travelling at a speed typically used on highways.

Application of Braking Force:

The present invention includes various mechanisms for retrofitting a GSE to enable application of braking force, using the already existing controls and elements of the braking system with minimal changes to the GSE.

Figure 2:
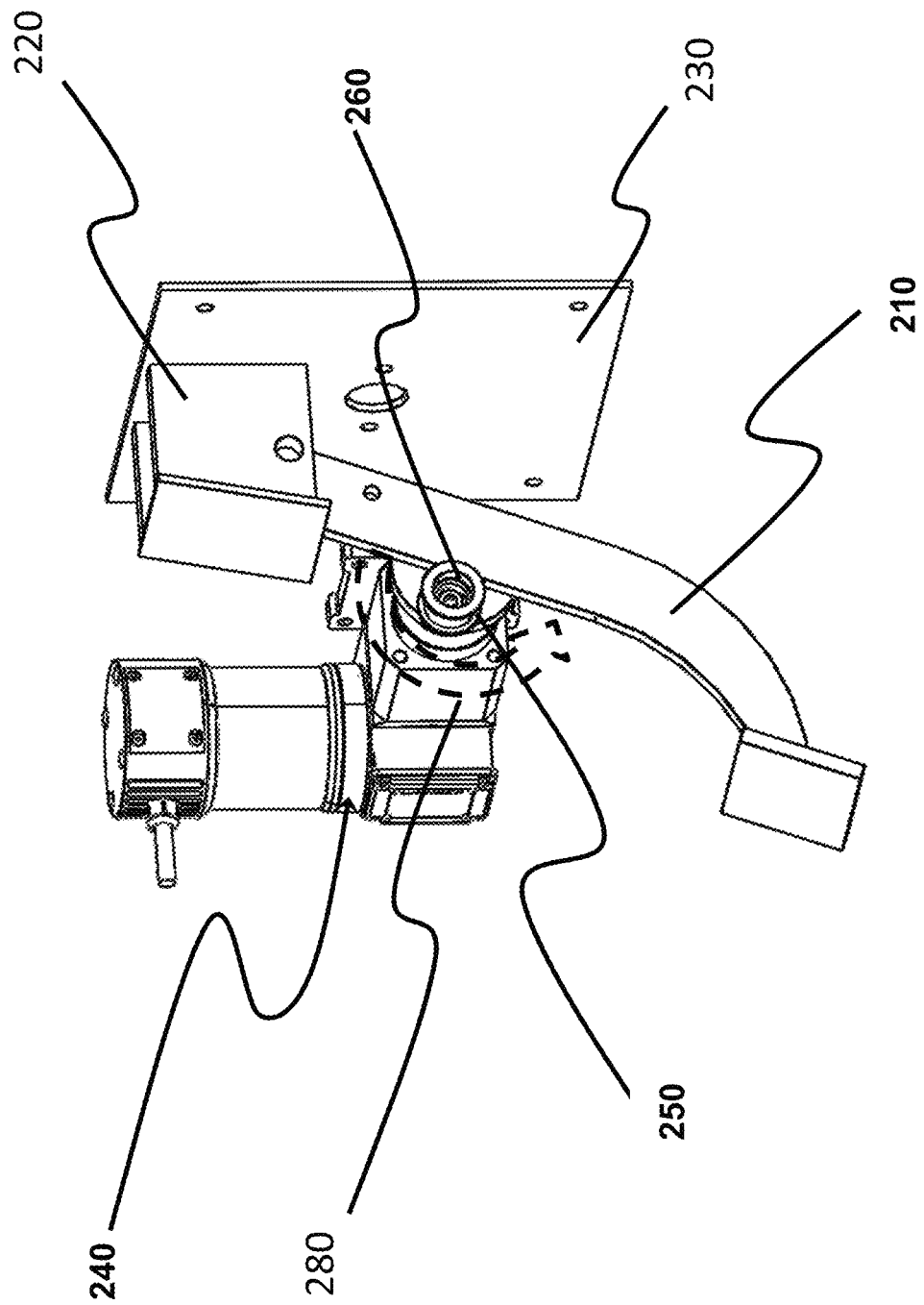
FIG. 2 is a schematic illustration of a subsystem for gradual application of a braking force according to an embodiment of the invention.
Figure 3:
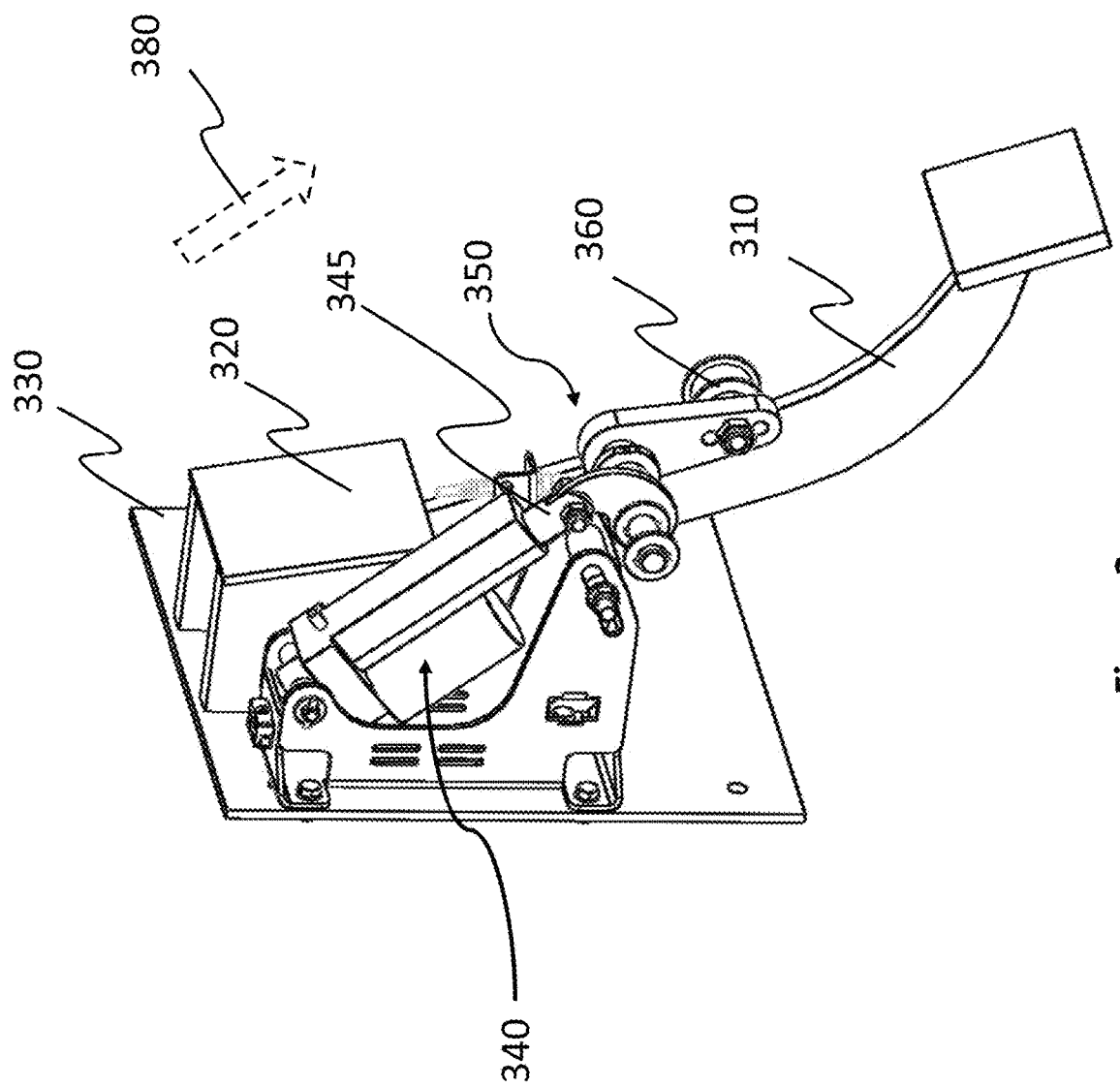
FIG. 3 is a schematic illustration of a subsystem for gradual application of a braking force according to another embodiment of the invention.
Figure 4:
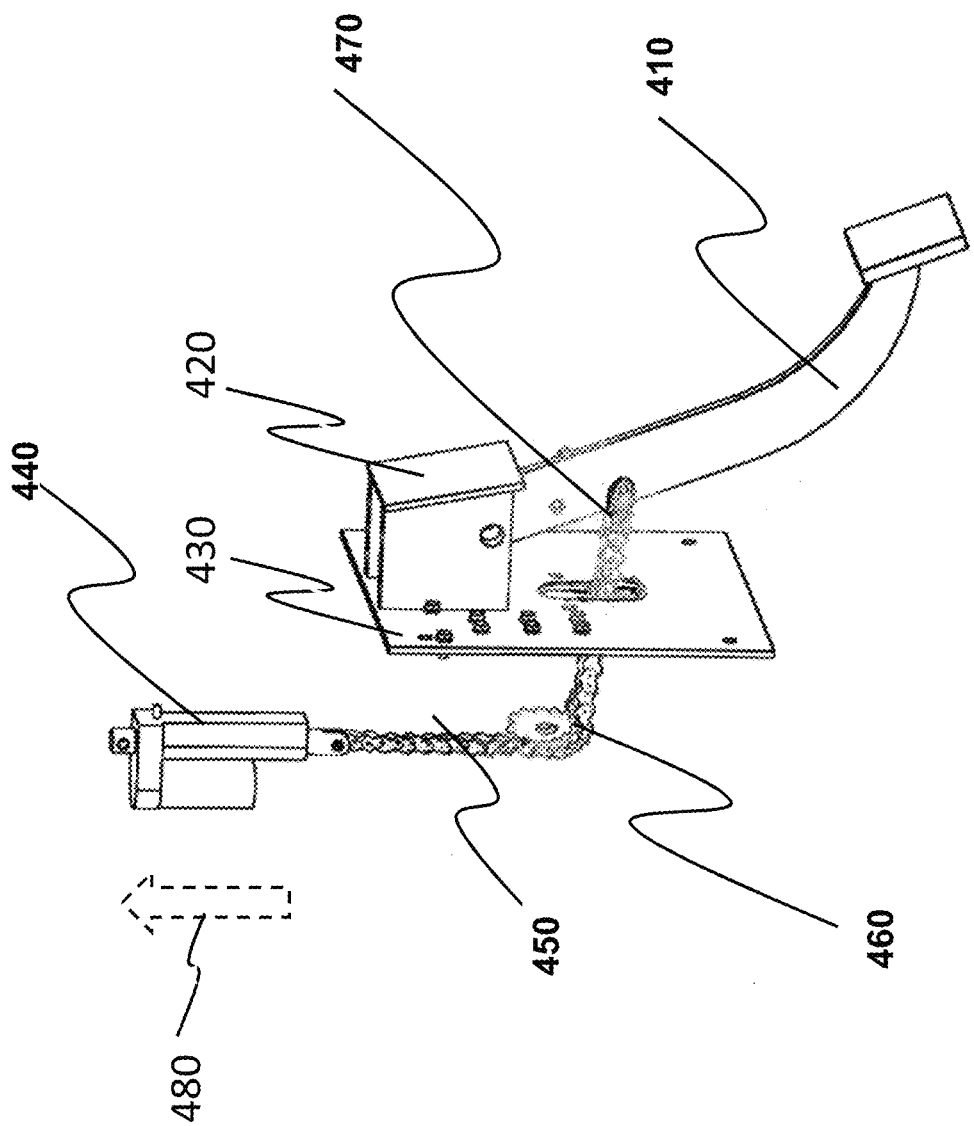
FIG. 4 is a schematic illustration of a subsystem for gradual application of a braking force according to a third embodiment of the invention.

FIGS. 2, 3, and 4 show three embodiments of subsystems for gradual application of a braking force by applying force to the GSE's brake pedal. It is appreciated that even though the embodiments of FIGS. 2, 3, and 4 all show application of a braking force by moving the brake pedal, the scope of the present invention includes application of a braking force by any suitable mechanism, such as by any mechanical linkage or hydraulic element disposed downstream of the breaking system.

In the embodiment shown in FIG. 2, a brake pedal 210 is connected to a base 220 by a hinge, and base 220 is rigidly connected to GSE body 230 (schematically shown as a plate) as is known in the art of GSE. In accordance with an embodiment of the present invention, a rotary actuator 240, which in some embodiments includes a motor and a corresponding gear, is connected to body 230, in some embodiments by a rigid connection. An eccentric lever 250 is connected, at one end thereof, to rotary actuator 240, such that motion and/or rotation of eccentric lever 250 is driven and controlled by rotation or motion of rotary actuator 240. A roller, or cam follower, 260 is connected to the opposing end of eccentric lever 250 by a hinge that allows the roller 260 to freely rotate about its axis.

In use, during normal travel, eccentric lever 250 and roller 260 remain in their initial position, thereby ensuring that there is no interference in the normal operation of the brakes.

As shown in FIG. 2, in use, when lever 250 is rotated in the direction illustrated by dashed arrow 280, roller 260 is moved toward pedal 210, while rotating about its own axis, and pushes pedal 210 towards body 230, which in turn causes braking force to be applied to the GSE's wheels. When lever 250 is released and rotates in a direction opposed to that shown by arrow 280, the pressure applied by roller 260 is released, thus decreasing the force applied to pedal 210, and the braking force applied to the wheels. Rotation and release of lever 250 are controlled by operation of rotary actuator 240, which in turn may be controlled by a computerized control system. In some embodiments the control system may be a dedicated control system, while in other embodiments, the control system may be the existing control system of the GSE, which is specifically modified or programmed for application of control signals to rotary actuator 240 at designated times, without necessitating the operator to take action in order to apply braking force, as explained in further detail hereinbelow with respect to FIGS. 10A to 10B.

It is a particular feature of the present invention and of the embodiment of FIG. 2, that the implementation disclosed therein is fail-safe, and cannot interfere with normal function of the brake pedal or braking mechanism even if the ABC system were to malfunction.

In the embodiment illustrated in FIG. 3, a brake pedal 310 is hingedly connected to a base 320, which in turn is connected to GSE body 330 (schematically shown as a plate), typically by a rigid connection, as known in the art of GSE. In accordance with an embodiment of the present invention, a linear actuator 340 is rigidly connected to body 330. Linear actuator 340 includes a piston 345, which is connected to a lever sub-system 350, typically via a hinge, at one end of the lever sub-system. A roller 360 is hingedly connected to lever sub-system 350, at an opposing end thereof, such that roller 360 can freely rotate around its axis.

In use, during normal travel, eccentric lever piston 345 and roller 360 remain in their initial position, thereby ensuring that there is no interference in the normal operation of the brakes.

In use, when piston 345 extends in the direction indicated by arrow 380, lever sub-system 350 rotates toward brake pedal 310. Rotation of lever sub-system 350 causes roller 360 to apply pressure to brake pedal 310, pushing the brake pedal towards body 330, which in turn causes braking power to be applied to the GSE's wheels. When piston 345 is released, or moved in a direction opposed to that shown by arrow 380, the pressure applied by roller 360 is released, thus decreasing the force applied to pedal 310, and the braking force applied to the wheels. Rotation and release of lever sub-system 350 are controlled by extension and retraction of piston 345 of linear actuator 340, which in turn may be controlled by a computerized control system. In some embodiments the control system may be a dedicated control system, while in other embodiments, the control system may be the existing control system of the GSE, specifically modified or programmed for application of control signals to linear actuator 340 at designated times, without necessitating the operator to take action in order to apply braking force, as explained in further detail hereinbelow with respect to FIGS. 10A to 10B.

In the embodiment illustrated in FIG. 4, a brake pedal 410 is hingedly connected to a base 420, which in turn is connected to GSE body 430 (schematically shown as a plate), typically by a rigid connection, as is known in the art of GSE. In accordance with an embodiment of the present invention, a linear actuator 440, typically including a piston, may be rigidly connected to GSE body 430 at a convenient location.

A linking chain 450 extends between actuator 440 and brake pedal 410. In some embodiments, such as the illustrated embodiment, linking chain 450 is guided by a guiding roller 460, which is adapted to align and maintain the desired tension in linking chain 450. In some embodiments, linking chain 450 may be directly attached to brake pedal 410. Linking chain 450 includes a collapsible section 470, disposed between brake pedal 410 and guiding roller 460. In the illustrated embodiment, linking chain 450 extends through a bore in plate 430. However, in other embodiments, the positioning of linear actuator 420 may be such that linking chain 450 may extend around, or on one side of, plate 430, which may represent, for example, a firewall or floor of the GSE.

In use, during normal travel, the piston of linear actuator 420 is fully extracted, and thus linking chain 450 does not apply any force to brake pedal 410. When the driver applies force to brake pedal 410 to activate the brakes, collapsible section 470 of linking chain 450 collapses, or changes its shape, thereby ensuring that there is no interference in the normal operation of the brakes.

When the inventive adaptive braking control system triggers application of the brakes, for example in accordance with the method described hereinbelow with respect to FIGS. 10A to 10B, the piston of linear actuator 420 moves in the direction indicated by arrow 480, pulling an end of linking chain 450. As a result, linking chain 450 pulls brake pedal 410 toward plate 430, causing gradual application of the brakes of the GSE. When the piston of linear actuator 420 is extracted in a direction opposed to that shown by arrow 480, pull of linking chain 450 on brake pedal 410 is release, thereby releasing the brake pedal and decreasing the braking force applied to the wheels. Extension and release of the piston of linear actuator 440 may be controlled by a computerized control system. In some embodiments the control system may be a dedicated control system, while in other embodiments, the control system may be the existing control system of the GSE, specifically modified or programmed for application of control signals to linear actuator 440 at designated times, without necessitating the operator to take action in order to apply braking force, as explained in further detail hereinbelow with respect to FIGS. 10A to 10B.

In some variations of the embodiment illustrated in FIG. 4, linking chain 450 may be replaced by a suitable cable, such as a suitably strong steel cable or nylon cable.

Figure 5:
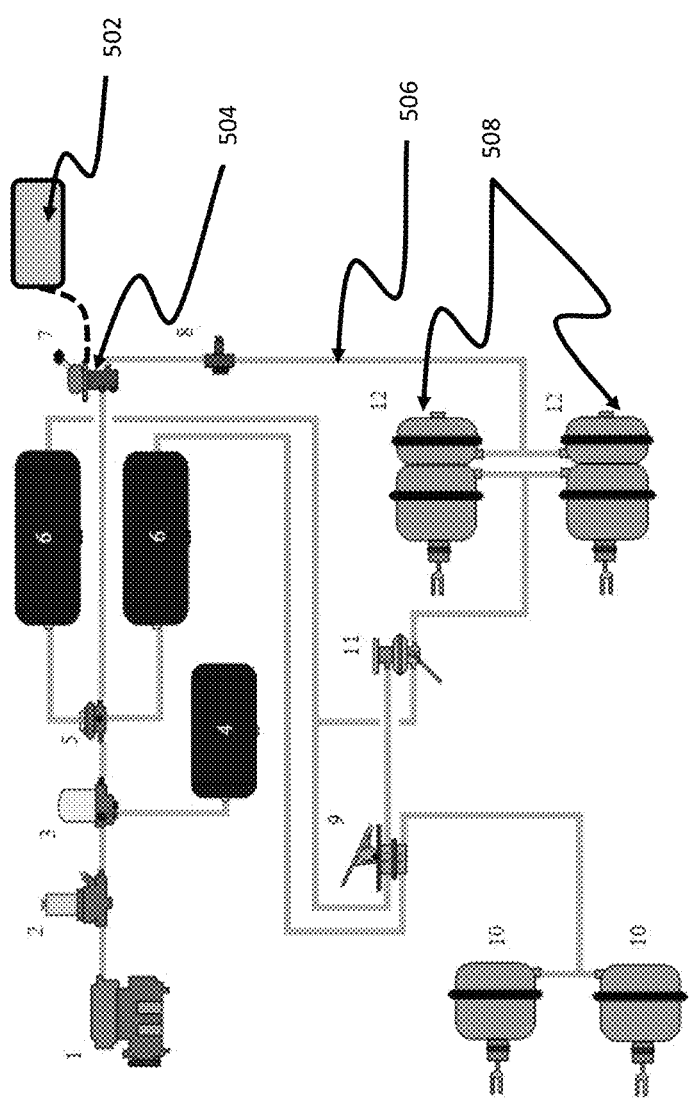
FIG. 5 is a schematic illustration of a braking subsystem which applies braking force by directly affecting a command or valve applying the braking force, such as a pneumatic or hydraulic braking subsystem.

Reference is now made to FIG. 5, which is a schematic illustration of a braking subsystem 500 which applies braking force by directly affecting a command or valve applying the braking force, such as a pneumatic or hydraulic braking subsystem. As seen in FIG. 5, in some embodiments, application of braking force may be caused by directly affecting the command or valve applying braking force.

Figure 10A:
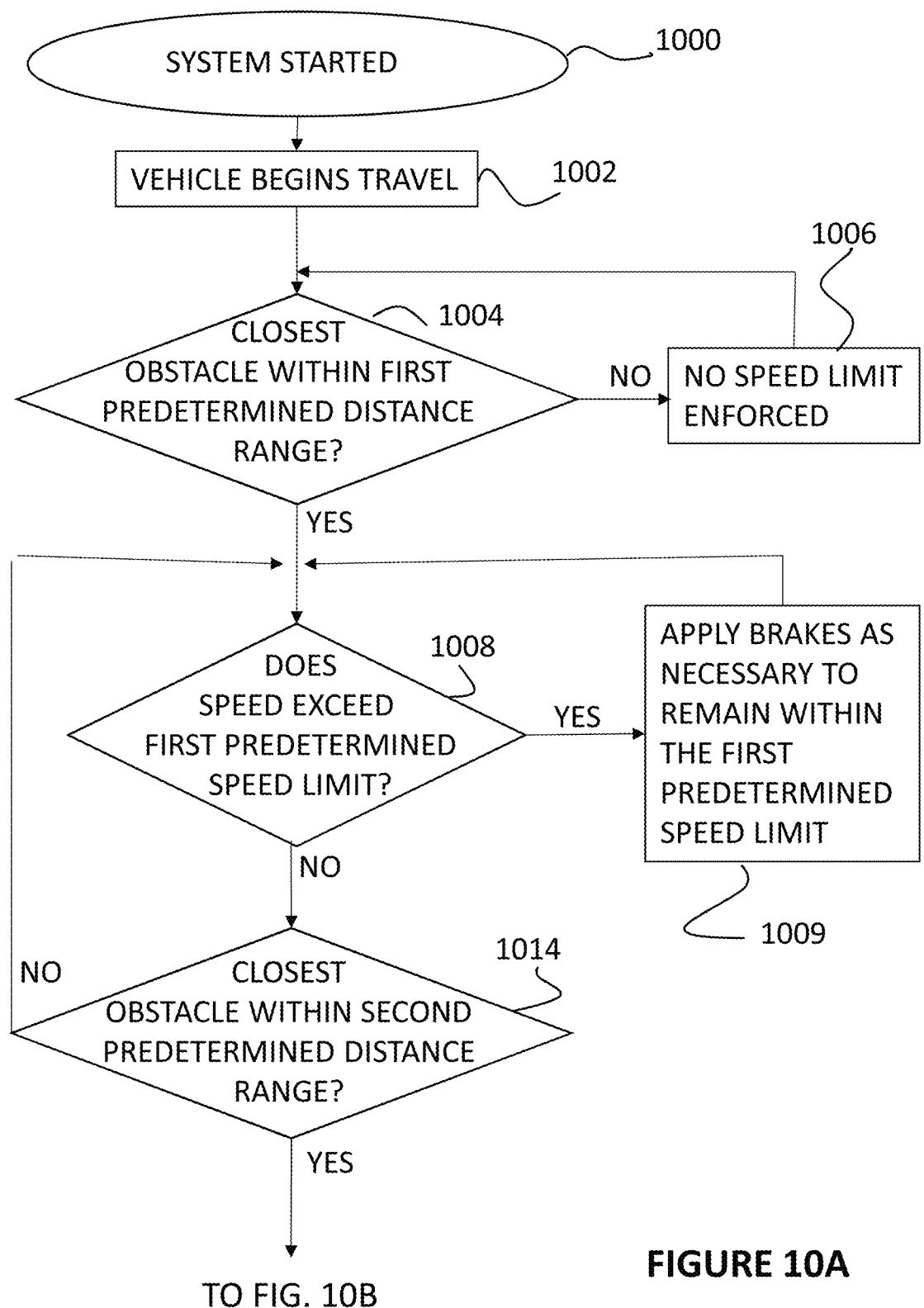
FIGS. 10A and 10B, together are a flow chart of a method of using systems of the invention.
Figure 10B:
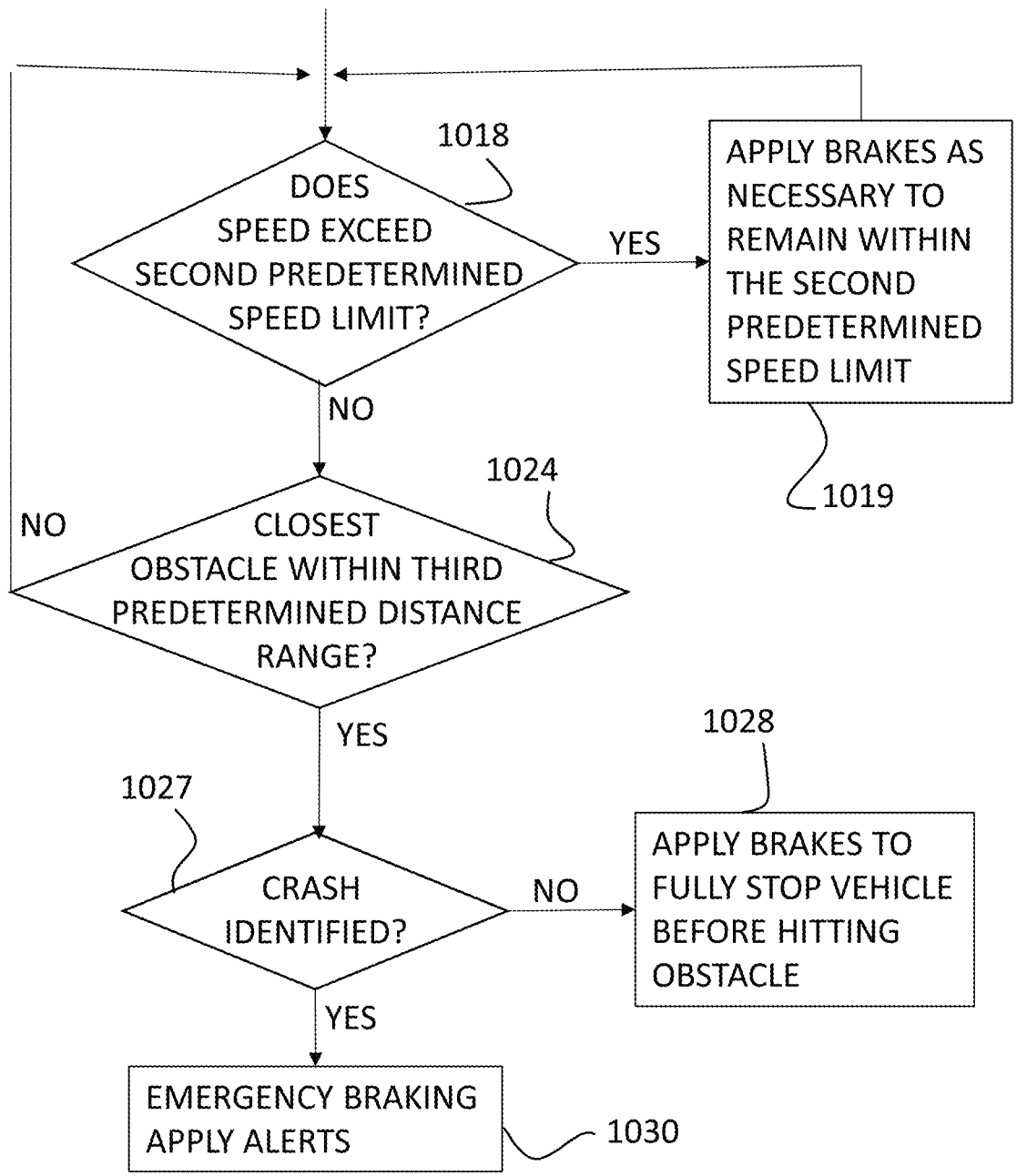

In such embodiments, when a braking force must be applied (for example as determined in accordance with the flow chart of FIGS. 10A to 10B), a controller, such as controller 110 of FIG. 1, provides command signals, which may be electrical signals, to an electric control element 502. The electric control element 502 is adapted to control a brake valve 504 of the GSE. The command signals provided from the controller, via electric control element 502 to brake valve 504, cause gradual opening of the valve 504, so that air pressure flows via a suitable conduit 506 into a pneumatic brake chamber 508, resulting in application of the brakes in response to the increased air pressure in brake chamber 508.

When it is determined that the speed of the GSE has been sufficiently reduced, and is now below the required threshold (for example as described with respect to FIGS. 10A to 10B), controller 110 provides a command, via electric control element 502, to cause the brake valve to gradually close, resulting in release air from the valve, which causes a reduction in the braking force applied by brake chamber 508.

In some embodiments, the brake valve 504 controls brake chamber 508 that contains a spring loaded pneumatic parking brake, also known as 'MAXI brakes', which are well known in the art. Such spring loaded pneumatic parking brakes are often installed on heavy vehicles and GSEs. In such embodiments, in addition to applying a braking force to the vehicle by increasing air pressure in the service brakes of the GSE, a braking force may additionally or alternatively be applied by triggering valve 502 to release air pressure from brake chamber 508, causing activation of the parking brake (MAXI) chamber, which applies partial or full braking force to the wheel.

Figure 6:
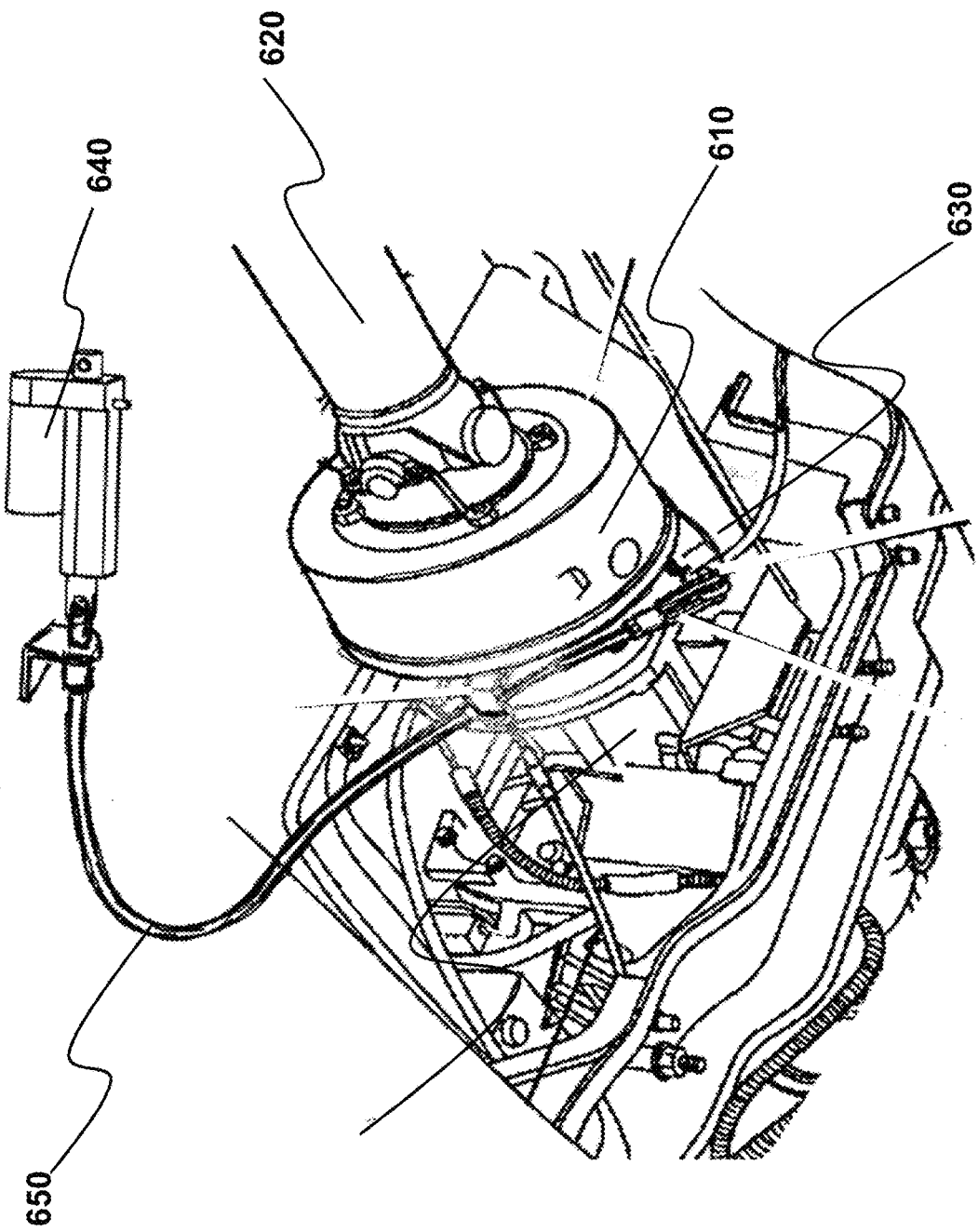
FIG. 6 is a schematic illustration of a braking subsystem which applies braking force by operating a parking brake which may be installed on the GSE transmission output shaft or drive shaft.

Reference is now made to FIG. 6, which is a schematic illustration of a braking subsystem 600 which applies braking force by operating a parking brake, which may be installed on the GSE transmission output shaft or drive shaft. In the embodiment illustrated in FIG. 6, a parking brake 610 installed on the drive shaft 620 of the GSE. A parking brake actuating lever 630, is analogous to brake pedal 210, 310, 410 shown in FIGS. 2, 3 and 4, respectively, and as such—analogous techniques to those shown in FIGS. 2, 3, and 4, can be utilized in order to apply braking force to parking brake actuating lever 630.

The embodiment shown in FIG. 6 is analogous to the embodiment of FIG. 4, and employs a linear actuator 640 and a cable or linkage 650. In an embodiment, if actuator 640 is the inherent actuator used in the GSE (e.g. powered by hydraulic or air valve), the braking force may be applied to the actuator, via the air valve, as described hereinabove with respect to FIG. 5.

Figure 7A:
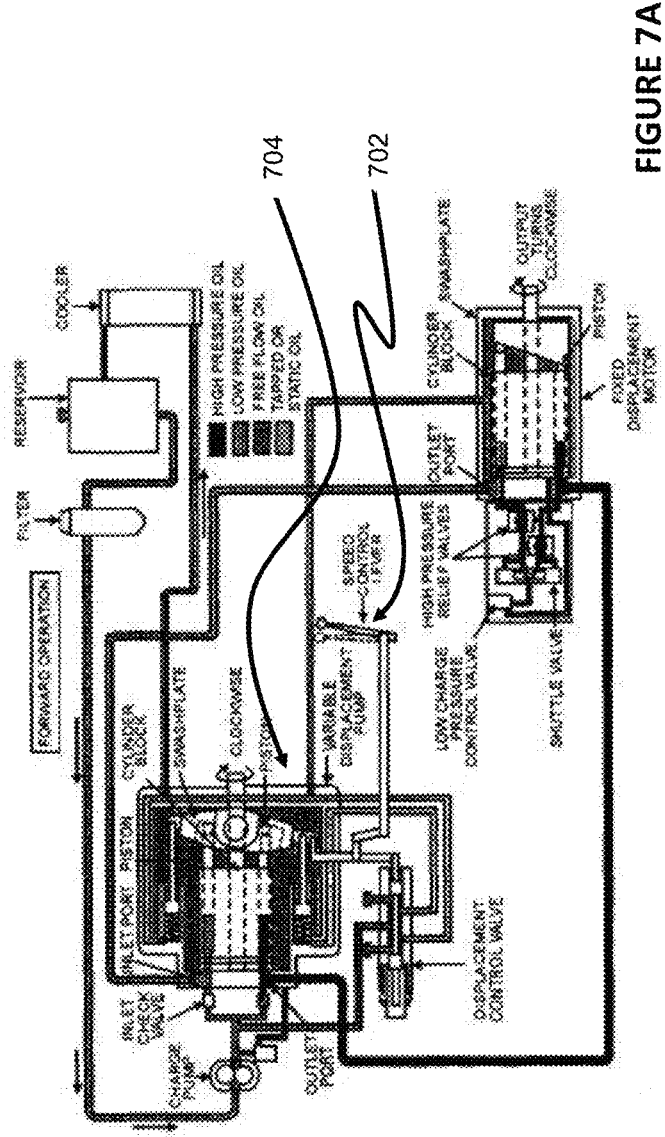

Reference is now made to FIGS. 7A and 7B, which are, respectively, a schematic representation of a hydrostatic drivetrain 700 including a speed control lever 702, and a schematic representation of a sub-system for controlling oil flow within the hydrostatic drivetrain in order to apply braking force and/or to control the speed of the GSE, according to an embodiment of the invention.

As seen in FIG. 7A, the hydrostatic drivetrain 700 is a typical hydrostatic drivetrain, which is common in many types of GSE, and in which it is possible to control the speed of the GSE by controlling oil flow through a variable displacement pump 704, by operation of speed control lever 702, operation of which causes a volumetric change to variable displacement pump 704.

In the inventive embodiment shown in FIG. 7B, the sub-system includes a linear actuator 710 including a piston 711, which is attached to speed control lever 712 (equivalent to speed control lever 702 of FIG. 7A). Speed control lever 712 is attached to variable displacement pump 714 (equivalent to variable displacement pump 704 of FIG. 7A), such that motion of speed control lever 712 decreases the volume within variable displacement pump 714 thereby reducing the speed of the GSE.

In use, during normal travel, the linear actuator 710 maintains the speed control lever 712 in the position pre-set by the operator, such that the speed is controlled only by interaction of the operator with the accelerator and brake pedals of the GSE.

When the inventive adaptive braking control system triggers slowing down of the GSE, for example in accordance with the method described hereinbelow with respect to FIGS. 10A to 10B, the linear actuator 710 receives a signal triggering motion of piston 711, which causes speed control lever 712 to move, changing the volume within variable displacement pump 714 and causing slowing of the GSE. When the piston 711 of linear actuator 710 resumes its original position, speed control lever 712 is returned to its initial position, thereby again changing the volume within variable displacement pump 714. Operation of linear actuator 710 may be controlled by a computerized control system. In some embodiments the control system may be a dedicated control system, while in other embodiments, the control system may be the existing control system of the GSE, specifically modified or programmed for application of control signals to linear actuator 710 at designated times, without necessitating the operator to take action in order to apply braking force, as explained in further detail hereinbelow with respect to FIGS. 10A to 10B.

It is appreciated that although FIG. 7B illustrates the use of a linear actuator 710, directly connected to the speed control lever 712, any suitable system for manipulating speed control lever 712 is considered within the scope of the present invention. For example, speed control lever 712 may be controlled by a rotary actuator, using a system equivalent to that described hereinabove with respect to FIG. 2, or by a linear actuator, using a system equivalent to one of those described hereinabove with respect to FIGS. 3 and 4.

Figure 8A:
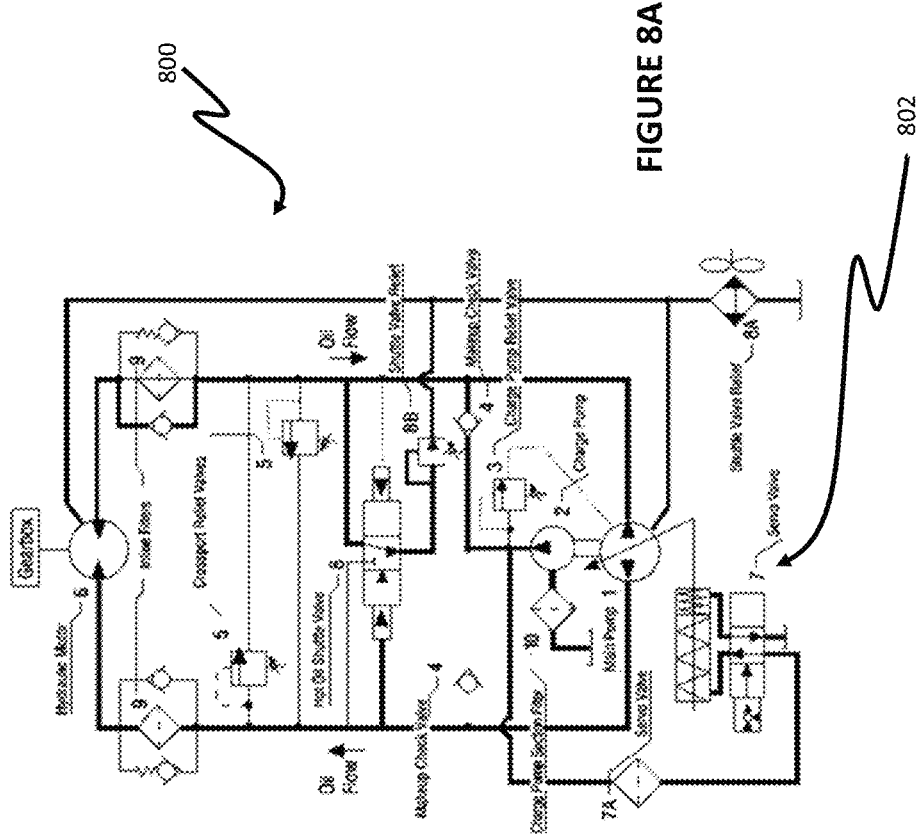
FIGS. 8A and 8B are, respectively, a schematic representation of a gear system including a hydraulic servo-valve, which may form part of a hydrostatic drive train, and a schematic representation of a sub-system for controlling operation of the hydraulic servo-valve in order to apply braking force or otherwise limit the speed of the GSE, according to an embodiment of the invention.
Figure 8B:
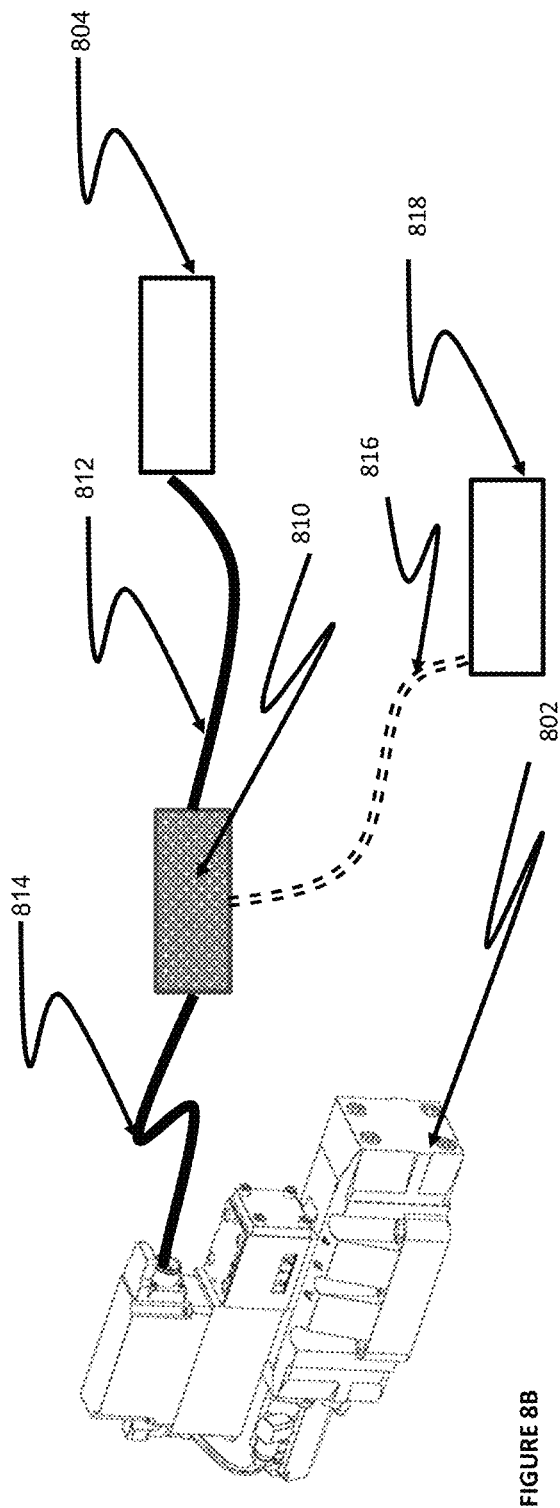

Reference is now made to FIGS. 8A and 8B, which are, respectively, a schematic representation of a transmission system 800 of a hydraulic motor, which includes a hydraulic servo-valve 802, and a schematic representation of a sub-system for controlling operation of the hydraulic servo-valve in order to apply braking force and/or limit the speed of the GSE, according to an embodiment of the invention.

As seen in FIG. 8A, the gear system 800 is a typical transmission system of a hydraulic motor, which is common in many types of GSE, and which includes one or more hydraulic servo valves 802. Servo valves 802 are typically controlled by signals received from a control unit 804 (not explicitly shown) of the GSE, via suitable wiring (not explicitly shown).

In the inventive embodiment shown in FIG. 8B, the sub-system includes a splitter box 810, inserted between hydraulic servo valve 802 and the control unit 804, such that first wiring 812 transmits signals from control unit 804 to splitter box 810, and second wiring 814 transmits signals from splitter box 810 to hydraulic servo valve 802. Third wiring 816, connects splitter box 810 to a controller 818 of the adaptive brake control system of the present invention (for example controller 110 of FIG. 1).

In use, during normal travel, the hydraulic servo valve receives signals from control unit 804, via splitter box 810 and first and second wirings 812 and 814, such that the operation of the motor/pump, and consequently the speed of the GSE, is controlled only by interaction of the operator with the accelerator and brake pedals of the GSE.

When the inventive adaptive braking control system triggers slowing down of the GSE, for example in accordance with the method described hereinbelow with respect to FIGS. 10A to 10B, a signal is provided to hydraulic servo valve 802 from the controller 818 of the adaptive braking control system, via splitter box 810 and wirings 814 and 816, causing the hydraulic servo valve to trigger slowing of the GSE. When the GSE has slowed sufficiently, the controller 818 sends another signal to hydraulic servo valve 802, so as to stop slowing the GSE, and/or to relinquish control of the speed of the GSE back to the operator.

Figure 9:
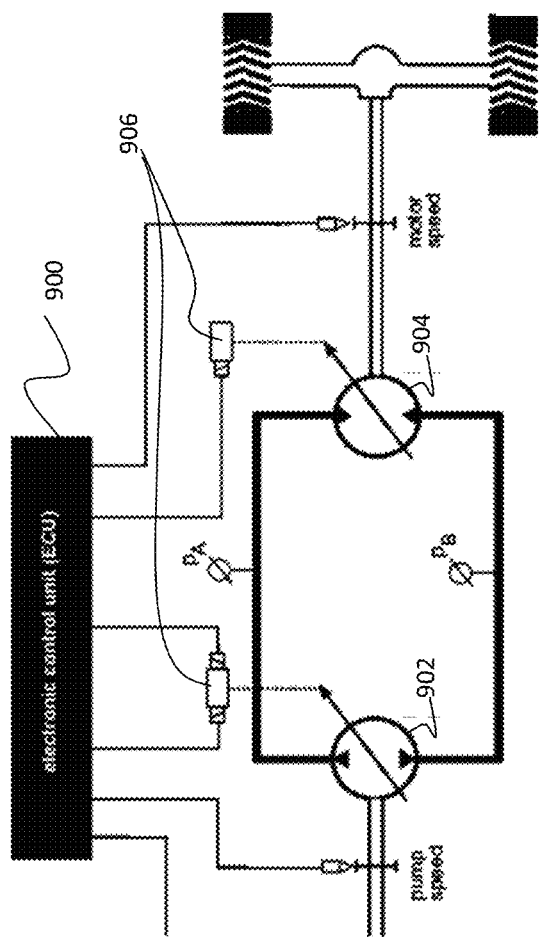
FIG. 9 is a schematic illustration of a hydrostatic transmission system including an electronic control unit, which is controlled in order to apply a braking force or otherwise limit the speed of the GSE, according to another embodiment of the invention.

Reference is now made to FIG. 9, which is a schematic illustration of a hydraulic energized brake system including an electronic control unit (ECU) 900, a hydraulic pump 902, and a hydraulic motor 904, both associated with and controlled by corresponding displacement valves, or elements, 906.

In the embodiment illustrated in FIG. 9, controller 910 of the adaptive brake control system of the present invention (for example controller 110 of FIG. 1) provides signals to the electronic control unit 900, for example using the CANBUS communication protocol where such exists, which signals override the pedal output to activate the brakes as required to control the speed of the GSE. More specifically, the signals received by the ECU trigger changes to the displacement elements 906, thereby to cause changes to the operation of hydraulic pump 902 and/or hydraulic motor 904, so as to slow the vehicle if it is going too fast, as determined by controller 910, for example using the method of FIGS. 10A to 10B.

Reference is now made to FIGS. 10A and 10B, which together are a flow chart of a method of using systems of the invention to maintain operation of a GSE in accordance with IATA regulation.

Briefly, the vehicle speed as well as its distance from obstacles are constantly monitored, and the inventive system uses the monitored readings to identify problems according to preset rules, and responds based on identification of such problems.

The numeral values provided in the Figures, and in the description below, are used as distance and speed measures and are approximately the values set by the current IATA regulations. However, the scope of the invention is not limited to the specific numeric values described herein, and operation of the system using a similar logical flow and other values is considered within the scope of the present invention. For example, different numeric values may be chosen to comply with a change in the regulations, or if a different response is desired at a specific regime of speed or distance from obstacles.

As seen in FIG. 10A, initially, the inventive adaptive brake control system, as illustrated in FIG. 1, is activated at step 1000. The activation of the system may occur manually or automatically, for example upon ignition of the engine of the GSE. Upon activation of the system, the distance and speed sensors (120, 130, FIG. 1) begin providing signals to the system controller (110, FIG. 1). In some embodiments, the sensors provide signals continuously, or periodically at a predetermined sampling rate, the sampling rate being in the range of once every 1 millisecond to once every 100 milliseconds.

The GSE begins moving at step 1002.

The system controller continuously processes the signals received from the distance and speed sensors.

At step 1004, the controller evaluates, based on the received signals, whether there is an obstacle within a first predetermined distance range from the GSE. For example, the first predetermined distance range is 3 to 7 meters. If at step 1004 the controller identifies that there is no obstacle within the first predetermined distance range from the GSE, the system does not enforce any speed limitations at step 1006, and flow returns to step 1004, to continue evaluating the presence of an obstacle near the GSE.

Otherwise, if at step 1004 it is determined that an obstacle is within the first predetermined distance range from the GSE, at step 1008 the controller evaluates whether the current speed of the GSE exceeds a first predetermined speed limit. If the first predetermined speed limit has been exceeded, at step 1009, the controller causes the brake actuator (150, FIG. 1) to apply the brakes or otherwise slow the GSE in order to stop the GSE from exceeding the first predetermined speed limit, and to return the speed of the GSE to be within the first predetermined speed limit, which is predetermined for the first distance range. For example, in some embodiments, the first predetermined speed limit is 6 km/h. Application of the brakes and slowing of the GSE may utilize any of the mechanisms described hereinabove, and any other suitable mechanisms.

In some embodiments, the application of brakes at step 1009 includes partial application of brakes, and re-evaluation of the speed of the GSE to determine whether it is still above the first predetermined speed limit and whether additional application of brakes is required.

At step 1014, the controller evaluates, based on the received signals, whether the GSE has moved sufficiently such that the obstacle is now within a second predetermined distance range from the GSE. For example, the second predetermined distance range is 0.5 to 3 meters. If at step 1014 the controller identifies that there is no obstacle within the second predetermined distance range from the GSE, the flow returns to step 1008, for the system to continue ensuring that the GSE continue to travel at a speed beneath the first speed limit.

Otherwise, if at step 1014 it is determined that an obstacle is within the second predetermined distance range from the GSE, at step 1018 the controller evaluates whether the current speed of the GSE exceeds a second predetermined speed limit. If the second predetermined speed limit has been exceeded, at step 1019, the controller causes the brake actuator (150, FIG. 1) to apply the brakes or otherwise slow the GSE in order to stop the GSE from exceeding the second predetermined speed limit, and to return the speed of the GSE to be within the second predetermined speed limit, which is predetermined for the second distance range. For example, in some embodiments, the second predetermined speed limit is 0.8 km/h. Application of the brakes and slowing of the GSE may utilize any of the mechanisms described hereinabove, and any other suitable mechanisms.

In some embodiments, the application of brakes at step 1019 includes partial application of brakes, and re-evaluation of the speed of the GSE to determine whether it is still above the first predetermined speed limit and whether additional application of brakes is required.

At step 1024, the controller evaluates, based on the received signals, whether the GSE has moved sufficiently such that the obstacle is now within a third predetermined distance range from the GSE. For example, the third predetermined distance range is 0 to 0.5 meters. If at step 1024 the controller identifies that there is no obstacle within the second predetermined distance range from the GSE, the flow returns to step 1018, and the system continues to ensure that the GSE is travelling at a speed slower than the second speed limit.

Otherwise, if at step 1024 it is determined that an obstacle is within the second predetermined distance range from the GSE, at step 1027, the system determines whether, in spite of all the steps taken, a collision has occurred between the GSE and an obstacle, such as an aircraft.

If no collision has occurred, at step 1028 the controller causes the brake actuator (150, FIG. 1) to apply the brakes to fully stop the GSE before the GSE collides with the obstacle. Application of the brakes and slowing of the GSE may utilize any of the mechanisms described hereinabove, and any other suitable mechanisms.

Otherwise, if a collision has occurred, at step 1030 the controller applies an emergency braking process for immediately fully stopping the GSE, and applies alerts to the operator of the GSE, or any other control and operation personnel, indicating that a collision has occurred, for example using the alarm (160, FIG. 1).

As would be apparent to the person skilled in the art, in some embodiments, such as the embodiments illustrated in FIGS. 7A to 9, application of brakes as mentioned in step 1009 of FIG. 10A and in step 1019 of FIG. 10B is replaced with a different action designed to decrease the speed of the GSE, as described hereinabove.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An adaptive brake control system for use in Ground Support Equipment (GSE) including a speed control system, the adaptive brake control system comprising:
    a distance sensor adapted to measure a distance from an edge of the GSE to an external object;
    a speed senor adapted to measure a ground speed of the GSE;
    a brake actuator adapted to cause the speed control system of the GSE to slow or stop the GSE; and
    a controller, functionally associated with said distance sensor, said speed sensor, and said brake actuator, said controller adapted to receive inputs from said distance sensor and said speed sensor, and, based on said received inputs, to trigger said brake actuator to affect slowing or stopping of the GSE, wherein said brake actuator comprises:
    a rotary actuator;
    a lever connected to said rotary actuator, such that motion of said lever is driven by rotation of said rotary actuator; and
    a roller connected to said lever, such that said roller is rotatable about its axis,
    wherein rotation of said rotary actuator in a first direction causes corresponding rotation of said lever and said roller, such that said roller applies force to said brake pedal to slow motion of said GSE, and rotation of said rotary actuator in a second, opposing direction causes corresponding rotation of said lever and said roller in said second direction, such that said roller relieves force from said brake pedal to enable acceleration of said GSE.

2. The adaptive brake control system of claim 1, further comprising at least one alarm system, functionally associated with said controller, and wherein said controller is adapted to trigger said alarm system to provide a perceivable alarm in response to said controller identifying hazardous conditions of said GSE.

3. The adaptive brake control system of claim 1, further comprising a wireless communication system, functionally associated with said controller, and wherein said controller is adapted to operate said wireless communication system to provides at least one signal to a location remote from the GSE.

4. The adaptive brake control system of claim 3, wherein said at least one signal comprises at least one of an alert signal, an alarm signal, a sensor reading, or an indication of an event.

5. The adaptive brake control system claim 1, wherein the speed control system of the GSE comprises a brake pedal.

6. The adaptive brake control system of claim 1, wherein the speed control system of the GSE comprises a pneumatic or hydraulic braking subsystem.

7. The adaptive brake control system of claim 6, wherein:
    said pneumatic or hydraulic braking subsystem includes a brake valve in fluid communication with a brake chamber; and
    said actuator comprises a valve controller adapted to provide command signals to said brake valve of said pneumatic or hydraulic braking subsystem, to change the pressure flow through said brake valve into said brake chamber, thereby to change the pressure in said brake chamber and to apply a braking force to the GSE.

8. The adaptive brake control system of claim 6, wherein said pneumatic or hydraulic braking subsystem comprises a hydrostatic drivetrain including a speed control lever and a variable displacement pump having a volume, said volume being controlled by said speed control lever.

9. The adaptive brake control system of claim 6, wherein:
    said pneumatic or hydraulic braking subsystem includes one or more hydraulic servo valves, in signal communication with an electronic control unit;
    said actuator includes a signal splitter box, disposed between said one or more hydraulic servo valves and said electronic control unit, and in signal communication with said controller of said adaptive brake control system,
    wherein said controller of said adaptive brake control system is adapted to provide electronic signals to said one or more hydraulic servo valves via said signal splitter box, thereby to affect slowing of the GSE.

10. A method of controlling the speed of a Ground Support Equipment (GSE) during motion of the GSE, the GSE having provided therein an adaptive brake control system of claim 1, the method comprising:
    at said controller, receiving inputs from said distance sensor and from said speed sensor;
    at said controller, based on said inputs, determining whether a speed of the GSE need be decreased; and
    in response to determining that said speed of the GSE need be decreased, at said controller, triggering said actuator to affect slowing or stopping of the GSE.

11. The method of claim 10, wherein said determining comprises determining whether said speed of the GSE need be decreased based on a correlation between distance inputs indicative of a distance of the GSE from another object, and speed inputs indicative of a current speed of the GSE.

12. The method of claim 11, wherein said correlation between said distance inputs and said speed inputs is based on regulatory requirements of the GSE.

13. The method of claim 10, further comprising, following said triggering said actuator, providing a signal indicative of said triggering of said actuator.

14. The adaptive brake control system of claim 1, wherein said lever is an eccentric lever.

15. A kit for retrofitting Ground Support Equipment (GSE) including a speed control system, to automatically slow the GSE in response to hazardous conditions, the kit comprising:
    a distance sensor adapted to measure a distance from an edge of the GSE to an external object;
    a speed sensor adapted to measure a ground speed of the GSE; and
    a brake actuator adapted to cause the speed control system of the GSE to slow or stop the GSE; and wherein said distance sensor, said speed sensor, and said actuator are adapted to be functionally associated with a controller, said distance sensor and said speed sensor are adapted to provide signals to said controller, and said controller is adapted, based on said signals provided by said distance sensor and said speed sensor, to trigger said actuator to affect slowing or stopping of the GSE, and wherein said brake actuator comprises:

a rotary actuator;

a lever connected to said rotary actuator, such that motion of said lever is driven by rotation of said rotary actuator; and a roller connected to said lever, such that said roller is rotatable about its axis, wherein rotation of said rotary actuator in a first direction causes corresponding rotation of said lever and said roller, such that said roller applies force to said brake pedal to slow motion of said GSE, and rotation of said rotary actuator in a second, opposing direction causes corresponding rotation of said lever and said roller in said second direction, such that said roller relieves force from said brake pedal to enable acceleration of said GSE.

16. The kit of claim 15, wherein said kit further includes said controller.

17. The kit of claim 15, wherein said controller forms part of said GSE, and, during retrofitting of said GSE using said kit, said distance sensor, said speed sensor, and said actuator are associated with said controller.

18. The kit of claim 15, wherein the speed control system of the GSE comprises a brake pedal.

19. The kit of claim 15, wherein the speed control system of the GSE comprises a pneumatic or hydraulic braking subsystem.

20. The kit of claim 19, wherein said actuator comprises a valve controller adapted to provide command signals to a brake valve of said pneumatic or hydraulic braking subsystem, to change the pressure flow through said brake valve into said brake chamber, thereby to change the pressure in said brake chamber and to apply a braking force to the GSE.

21. The kit for retrofitting Ground Support Equipment (GSE) of claim 15, wherein said lever is an eccentric lever.

22. A kit for retrofitting Ground Support Equipment (GSE) including a speed control system and a speed sensor, to automatically slow the GSE in response to hazardous conditions, the kit comprising:

a distance sensor adapted to measure a distance from an edge of the GSE to an external object; and a brake actuator adapted to cause the speed control system of the GSE to slow or stop the GSE; and wherein said distance sensor, tare speed sensor of the GSE, and said actuator are adapted to be functionally associated with a controller, said distance sensor and said speed sensor are adapted to provide signals to said controller, and said controller is adapted, based on said signals provided by said distance sensor and said speed sensor, to trigger said actuator to affect slowing or stopping of the GSE, wherein said brake actuator comprises:

a rotary actuator;

a lever connected to said rotary actuator, such that motion of said lever is driven by rotation of said rotary actuator; and a roller connected to said lever, such that said roller is rotatable about its axis, wherein rotation of said rotary actuator in a first direction causes corresponding rotation of said lever and said roller, such that said roller applies force to said brake pedal to slow motion of said GSE, and rotation of said rotary actuator in a second, opposing direction causes corresponding rotation of said lever and said roller in said second direction, such that said roller relieves force from said brake pedal to enable acceleration of said GSE.

23. The kit of claim 22, wherein said kit further includes said controller.

24. The kit of claim 15, wherein said controller forms part of said GSE, and, during retrofitting of said GSE using said kit, said distance sensor, said speed sensor, and said actuator are associated with said controller.

25. The kit claim 22, wherein the speed control system of the GSE comprises a brake pedal.

26. The kit of claim 22, wherein the speed control system of the GSE comprises a pneumatic or hydraulic braking subsystem.

27. The kit of claim 22, wherein said actuator comprises a valve controller adapted to provide command signals to a brake valve of said pneumatic or hydraulic braking subsystem, to change the pressure flow through said brake valve into said brake chamber, thereby to change the pressure in said brake chamber and to apply a braking force to the GSE.

28. A kit for retrofitting Ground Support Equipment (GSE) of claim 22, wherein said lever is an eccentric lever.

* * * * *